(12) United States Patent
Chuang

(10) Patent No.: US 6,207,089 B1
(45) Date of Patent: Mar. 27, 2001

(54) PROCESS FOR MANUFACTURING AN ELECTROMAGNETIC INTERFERENCE SHIELDING METALLIC FOIL CLADDED PLASTIC PRODUCT

(75) Inventor: Tung-Han Chuang, Taipei (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/139,610

(22) Filed: Aug. 25, 1998

(30) Foreign Application Priority Data

Feb. 5, 1998 (TW) ................................................ 87101537

(51) Int. Cl.[7] .................................................. B29C 45/16
(52) U.S. Cl. ........................ 264/135; 29/421.1; 29/527.4; 264/265; 264/267
(58) Field of Search .............................. 29/527.4, 421.1, 29/17.3, 527.3; 264/265, 267, 266, 135

(56) References Cited

U.S. PATENT DOCUMENTS

| | | | |
|---|---|---|---|
| 4,474,685 | 10/1984 | Annis ................................... | 264/105 |
| 4,916,016 | * 4/1990 | Bristowe et al. ..................... | 264/259 |
| 5,419,170 | * 5/1995 | Sanders et al. ...................... | 29/421.1 |
| 5,473,111 | * 12/1995 | Hattori et al. ....................... | 29/527.4 |
| 5,531,851 | 7/1996 | Lin et al. ............................. | 156/180 |
| 5,531,950 | * 7/1996 | Kimura et al. ....................... | 264/265 |
| 5,593,631 | * 1/1997 | Hara et al. ........................... | 264/265 |
| 5,746,956 | 5/1998 | Chuang et al. ...................... | 264/104 |
| 5,749,254 | * 5/1998 | Hall, Jr. ............................... | 29/421.1 |
| 5,792,482 | * 8/1998 | Yamamoto .......................... | 264/259 |

FOREIGN PATENT DOCUMENTS

| | | |
|---|---|---|
| 195 17 554 C 2 | 8/1997 | (DE) . |
| 55-55842 * | 4/1980 | (JP) ..................................... 264/265 |
| 61-137716 * | 6/1986 | (JP) ..................................... 264/265 |
| 4-327916 * | 11/1992 | (JP) ..................................... 264/265 |

* cited by examiner

Primary Examiner—Robert Davis
(74) Attorney, Agent, or Firm—Clark & Elbing, LLP

(57) ABSTRACT

The present invention provides a process and apparatus for manufacturing an electromagnetic interference shielding metallic foil cladded plastic product. The process comprises (a) coating one side of a superplastic alloy plate with a coupling agent or a hot melt adhesive; (b) placing the coupling agent- or hot melt adhesive-coated superplastic alloy plate in a mold, and superplastically forming the superplastic alloy plate to a superplastic alloy foil with a predetermined shape, such that another side of the superplastic alloy foil is attached to the mold and the coupling agent- or hot melt adhesive-coated side of the superplastic alloy foil is spaced apart from the mold to form a mold cavity, wherein an injection machine is attached to the mold cavity, and wherein the injection machine is capable of injecting softened plastic into the mold cavity; (c) introducing softened plastic from the injection machine to the mold cavity, such that plastic adheres on the coupling agent- or hot melt adhesive-coated side of the superplastic alloy foil, and an electromagnetic interference shielding metallic foil cladded plastic product is formed; and (d) removing the plastic product from the mold. The final metallic plastic product can not only have as intricate a shape as an ordinary plastic product, but also has a shielding effectiveness as high as an ordinary metallic shield.

12 Claims, 7 Drawing Sheets

PROCESS FOR MANUFACTURING AN ELECTROMAGNETIC INTERFERENCE SHIELDING METALLIC FOIL CLADDED PLASTIC PRODUCT

BACKGROUND OF THE INVENTION

1. Field of the Invention

The present invention relates to a process and apparatus for manufacturing an electromagnetic interference shielding metallic foil cladded plastic product, and more particularly to a process and apparatus for manufacturing an electromagnetic interference shielding metallic foil cladded plastic product by using two techniques, the superplastic forming of a superplastic alloy and the injecting of softened plastic.

2. Description of the Prior Art

In recent years, progress in technology has led to an extensive increase in the amount of sophisticated electronic equipment. However, the high-density electromagnetic waves produced from electronic equipment have the risk to damage or adversely affect the performance of other equipment or components. Also, exposure to electromagnetic waves is harmful to the human body. Therefore, an electrically conductive outer shell is needed to shield electromagnetic interference (EMI) produced from electronic equipment.

Heretofore, various methods have been used to shield electronic equipment. Metallic boxes and cans fabricated from steel, copper, aluminum, etc., were used to surround high EMI emitters as shielding. However, metallic shields with intricate shapes were difficult to be fabricated by the conventional metalworking methods. Moreover, metallic shields were cumbersome, heavy and costly. Therefore, the electronic industry has resorted to metallized plating on plastics. Unfortunately, the results obtained with metallic coatings were not always satisfactory. In addition to being relatively non-economical, once such metallic coatings were scratched through, they would lose part of their shielding efficiency. Unless such conductive coatings are continuous and free of voids, electromagnetic waves will be free to pass through. Frequently, it was difficult to obtain a dependable, 100% effective coating which was also resistant to peeling.

Further efforts by the electronics industry to develop more dependable light-weight materials for EMI shielding have led to a third approach, namely electrically conductive component-filled plastic composites. It was anticipated that intricate shapes could be molded from the composite materials by conventional means, yielding a finished part that promised to be more economical and dependable than metal or metal-coated plastics.

The principle factor influencing the performance of conductive component-filled plastic composites is the aspect ratio of the conductive fillers. The aspect ratio is defined as the ratio of the maximum dimension to the minimum dimension of the filler. For example, the aspect ratio of a fiber is the ratio of the length to the diameter of the fiber. According to the electromagnetic wave percolation theory, if the conductive filler in the plastic retains a higher aspect ratio, the filler easily forms a conductive network, thus, the critical concentration of the conductive filler required to achieve the electromagnetic shielding effect (that is, the threshold percolation concentration) is lower.

The methods for preparing conductive component-filled plastic composites can be classified into three types. The first type involves compounding the conductive fillers in the form of powders, short fibers or flakes with the plastic matrix, and then having the mixture hot-press molded or injection molded into various kinds of plastic products for shielding EMI.

For example, U.S. Pat. No. 4,474,685 discloses a process for fabricating electromagnetic shielding products by first compounding and then molding a composite including a thermosetting resin binder and an electrically conductive filler (including carbon black, graphite and conductive metal powders). However, during the compounding with the resin matrix, the conductive powders may easily cluster, and thus are not capable of dispersing in the resin matrix. Consequently, the electromagnetic shielding efficiency of the molded products can not be effectively improved. Furthermore, since the powder filler has a lower aspect ratio, according to the electromagnetic wave percolation theory as mentioned above, the amount (i.e., threshold percolation concentration) of the powder filler added must be relatively high to achieve electrical conductivity. Consequently, the mechanical properties, color and other physical and chemical properties of the molded products are adversely affected.

On the other hand, if the conductive filler is in a higher aspect ratio form such as fibers or flakes, the filler can be loaded to a lower level. However, the cluster phenomenon is still difficult to prevent. In addition, during the compounding process, in order to maintain the original aspect ratio, the conductive filler should be strong enough to prevent breakage due to compounding. However, such a strong conductive filler is very expensive, and is thus not suitable for ordinary low cost electronic equipment. More seriously, when the resultant plastic pellets containing such conductive filler with high strength are subjected to injection molding, the mold, screws and compressing cylinder walls of the injection machine will suffer extensive wear.

The second type of method for preparing conductive component-filled plastic composites involves binding a plastic layer to enclose the conductive continuous filler by immersion or extrusion, and then cutting the conductive long fiber-filled plastic stick to a predetermined length. For example, Japanese Patent No. 60-112854 discloses a process including continuous extruding thermoplastic plastic to enclose a copper fiber to form a copper fiber-filled plastic round stick, and then cutting the plastic round stick into pellets of a predetermined size. In order to increase the aspect ratio of the filler, the diameter of the conductive long fiber should be as small as possible. The fibrous filler must be strong enough to prevent breakage. Because the compounding step is omitted in the second method, clustering of the filler is improved. However, again, when the resultant plastic pellets containing a conductive filler with high strength are subjected to injection molding, the mold, screws and compressing cylinder walls of the injection machine will suffer extensive wear.

The third type of method for preparing conductive component-filled plastic composites involves sandwiching an electrically conductive metal foil in between two plastic films to form a metallized laminated plastic sheet; slicing the plastic sheet into plastic strips; radially arranging the metallized plastic strips into a die of an extruder to be wetted and bound by softened plastic into a metallized plastic bar; and finally cutting the plastic bar into metallized plastic pellets of a predetermined size, which has been disclosed in U.S. Pat. No. 5,531,851 and German Patent DE 19517554C2.

In the third method, the compounding step is omitted, thus clustering of the filler is improved. In addition, the metal foil in the plastic/metal/plastic laminated strips is reinforced by plastic. Therefore, even aluminum foil with lower strength is applicable. Hence, when the resultant plastic pellets are subjected to injection molding, the wearing of the mold, screws and compressing cylinder walls of the injection machine will be lessened. However, in the injection molding step, such aluminum foil with lower strength has a higher possibility of breaking. Therefore, there is a need to use a specially designed injection screw and injection mold.

The above three methods all involve subjecting the conductive pellets to hot-pressing or injection molding to obtain the final plastic article for shielding EMI. When injection molding is employed, in order to prevent lag, segregation, and orientional phenomena from occurring to the metallic filler in the mold, the design of the mold is very critical and complicated, thus increasing costs. Moreover, if a very thin product is desired, such as the outer shell of a notebook computer, the design of the mold is difficult, or even impossible to achieve.

In addition, floating phenomenon in the final conductive plastic article can not be prevented. Therefore, surface plastic coating on the final conductive plastic article is required, thereby increasing cost. Most importantly, according to the above three methods, the conductive filler in the plastic is not continuous (i.e. non-solid). Therefore, the resulting electromagnetic shielding effectiveness of such plastic article is limited and far less than that of a conventional metal outer shell.

Generally speaking, the shielding effectiveness of a conventional metal plate can reach 80 dB or more, which meets the requirement for various electronic equipment in various countries (FCC for U.S.A., VDE for Germany, VCCI for Japan, CSA for Canada, CISPR for Russia). However, a plastic article containing discontinuous (non-solid) conductive filler obtained from the above three methods has a shielding effectiveness of only about 50 dB, which can only meet the requirements for simple electronic equipment (40 dB), such as personal computers.

Nowadays, personal computers are usually equipped with CD-ROM, LSI, or other circuits of high density and high frequency. Therefore, in the future, it is anticipated that personal computers will require a higher shielding effectiveness, for example, 60 dB or more. Obviously, the plastic articles obtained from the above three methods will not meet the future needs. Furthermore, the conductive component-filled plastic articles obtained from the above three methods obviously can not be used for shielding the electronic equipment which needs high shielding effectiveness, such as work stations, remote control systems, cellular phones, and notebook computers.

Therefore, there is a need to provide a process for manufacturing a metallized plastic article having high shielding effectiveness (e.g., higher than 60 dB).

SUMMARY OF THE INVENTION

An object of the present invention is to solve the above-mentioned problems and to provide a process for manufacturing a metallized plastic product, which can have a shape as intricate as an ordinary plastic product, and which has the same high shielding effectiveness (higher than 60 dB) as that of an ordinary metallic shield. The metal layer in the final metallized plastic product is very thin, therefore, the final metallized plastic product is light in weight as ordinary plastic products. The adherence between metal and plastic is good. The manufacturing process is only one stage, cost is low, and environmental pollution is not a problem.

To achieve the above object, the process for manufacturing the metallized plastic article of the present invention includes the following sequential steps of:

(a) coating one side of a superplastic alloy plate with a coupling agent or a hot melt adhesive;

(b) placing the coupling agent- or hot melt adhesive-coated superplastic alloy plate in a mold, and superplastically forming the superplastic alloy plate to a superplastic alloy foil with a predetermined shape, such that another side of the superplastic alloy foil is attached to the mold and the coupling agent- or hot melt adhesive-coated side of the superplastic alloy foil is spaced apart from the mold to form a mold cavity, wherein an injection machine is attached to the mold cavity, and wherein the injection machine is capable of injecting softened plastic into the mold cavity;

(c) introducing softened plastic from the injection machine to the mold cavity, such that plastic adheres on the coupling agent- or hot melt adhesive-coated side of the superplastic alloy foil, and an electromagnetic interference shielding metallic foil cladded plastic product is formed; and (d) removing the plastic product from the mold.

According to the present invention, the apparatus for manufacturing an electromagnetic interference shielding metallic foil cladded plastic product comprises:

a mold, which is ready for receiving a superplastic alloy plate, wherein a vent line is provided in the mold;

an injection port of an injection machine, attached to the mold, wherein the injection machine is capable of introducing softened plastic to the mold through the injection port; and a stopper, movably disposed in the injection port and capable of controlling whether or not there is communication between the mold and the injection port, when the stopper is in the position such that the mold and injection port do not communicate, gas can be introduced to the mold through the vent line to superplastically blow the superplastic alloy plate to a superplastic alloy foil with a predetermined shape, and when the stopper is in the position such that the mold and injection port do communicate, softened plastic can be introduced from the injection machine to the mold and be adhered to one side of the superplastic alloy foil to form an electromagnetic interference shielding metallic foil cladded plastic product.

Further applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE PREFERRED EMBODIMENTS

Figure 1:
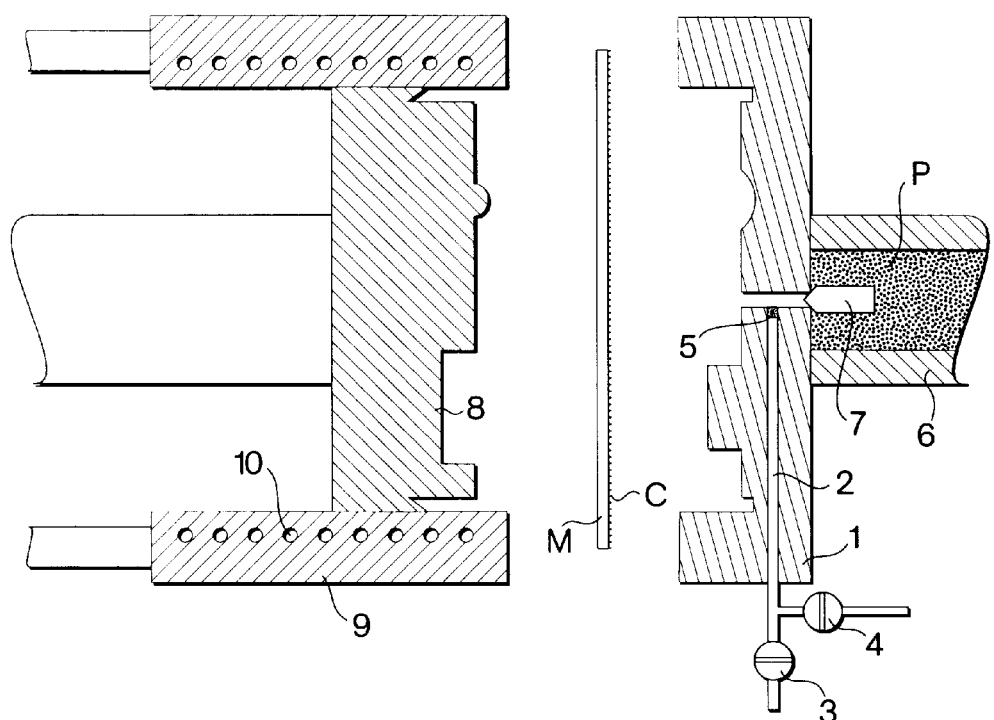
FIG. 1 shows a schematic diagram of the apparatus for manufacturing the electromagnetic interference shielding metallic foil cladded plastic product of the present invention.

To solve the problems of the conventional process, the inventor has successfully provided a novel process and apparatus for manufacturing metallized plastic products.

According to the present invention, the process for manufacturing the metallized plastic product uses two techniques, superplastic forming and injection molding.

First, one side of a superplastic alloy plate is coated with a coupling agent or a hot melt adhesive. Then, the superplastic alloy plate is placed in a mold and is superplastically formed to a superplastic alloy foil with a predetermined shape, such that another side of the superplastic alloy foil is attached to the mold and the coupling agent- or hot melt adhesive-coated side of the superplastic alloy foil is spaced apart from the mold to form a mold cavity. Then, softened plastic is introduced from an injection machine to the mold cavity, such that the plastic adheres on the coupling agent- or hot melt adhesive-coated side of the superplastic alloy foil, and an electromagnetic interference shielding metallic foil cladded plastic product is formed.

The so-called "superplastic alloy" is a specific alloy which undergoes very large deformations when a very low strain is applied under specific conditions. The requirements for a superplastic alloy include that: (1) the grain size of the superplastic alloy should be less than 10 μm; (2) the superplastic alloy is of dual-phase structure; (3) the superplastic alloy is deformed at a temperature that is higher than half of the absolute melting point of the superplastic alloy; and (4) the deformation rate is lower than $10^{-4}$ $sec^{-1}$, though some high rate superplastic alloys have been developed.

More than 200 kinds of superplastic alloys that have been reported or even commercialized, including zinc alloys, aluminum alloys, magnesium alloys, titanium alloys, tin alloys, duplex stainless steels, and super alloys. There is no special limitation for the type of superplastic alloy used in the present invention. However, to save energy, the superplastic alloy chosen preferably has a superplastic deforming temperature close to the softening point of the plastic chosen. Thus, the deforming of the superplastic alloy and the melting of the plastic can be performed in the same temperature range. In addition, for economical reasons, superplastic alloys of low cost are more acceptable because of the decrease in the total production cost. Table 1 lists the properties of some superplastic alloys suitable for use in the present invention; however, the suitable superplastic alloys are not limited to this list. The superplastic alloy plate to be used preferably has a thickness of less than 1 mm, but is not limited to this.

The coupling agents suitable for coating on the superplastic alloy include silanes, titantates, zirconates and aluminates. The hot melt adhesives suitable for coating on the superplastic alloy include polyvinyl acetate, ethylene vinyl acetate copolymers, rosin and terpene resin. The melting points of these adhesives are consistent with the softening points of plastic materials in the present invention.

The plastic material suitable for use in the present invention may be in the form of a plate or particles. Preferably, the plastic material is a thermoplastic, such as acrylonitrile-butadiene-styrene (ABS), polystyrene (PS), polyphenylene oxide (PPO) and acrylonitrile-butadiene-styrene/polycarbonate (ABS/PC) Table 2 lists the physical and mechanical properties of some frequently used thermoplastics.

TABLE 1

The properties of Some Superplastic Alloys Suitable for Use in the Present Invention

| Properties Alloy | Zn-22 Al | Zn-0.1 Ni-0.04 Mg | Sn-9.8 Zn | Sn-38 Pb | Mg-33 Al | Mg-6 Zn-0.5 Zr (Zk 60 A) | Mg-6 Al-1 Zn (Az 61 A) |
|---|---|---|---|---|---|---|---|
| Melting Point or Liquid Line (° C.) | 420 | 422 | 198 | 183 | 438 | 525 | 575 |
| Superplastic Temperature Range (° C.) | 20–300 | 75–300 | 20–180 | 20–170 | 82–437 | 230–350 | 230–350 |
| Best Superplastic Temperature Range (° C.) | 200–275 | 100–250 | 120–180 | 80–170 | 300–400 | 270–310 | 270–310 |
| Strain Rate of the Best Superplasticity ($sec^{-1}$) | $10^{-3}$–$10^{-1}$ | $10^{-3}$–$10^{-1}$ | $10^{-3}$–$10^{-1}$ | $10^{-3}$–$10^{-1}$ | $10^{-3}$–$10^{-1}$ | $10^{-3}$–$10^{-1}$ | $10^{-3}$–$10^{-1}$ |
| Rheological Strain of the Best Superplasticity ($kg/mm^2$) | 0.2 | 0.4 | 0.1 | 0.1 | 0.1 | 0.6 | 0.7 |
| Elongation of the Best Superplasticity (%) | 2900 | 980 | 570 | 4850 | 2100 | 1700 | 1700 |
| Strain Sensitivity of Superplasticity (m value) | 0.7 | 0.51 | 0.5 | 0.7 | 0.8 | 0.52 | 0.64 |
| Electric Resistivity ($\mu\Omega \cdot cm$) | 3.4 | 6.2 | 10.8 | 14.7 | 3.1 | 4.6 | 4.2 |
| Density ($g/cm^3$) | 2.8 | 7.1 | 7.2 | 8.4 | 1.8 | 1.6 | 1.5 |
| Tensile Strength ($kg/mm^2$) | 26.5 | 24.3 | 4.7 | 4.4 | 20.7 | 28.4 | 27.2 |
| Yield Strength (kg/mm2) | 22.5 | 20.4 | 3.2 | 2.5 | 17.5 | 26.3 | 25.4 |

TABLE 1-continued

The properties of Some Superplastic Alloys
Suitable for Use in the Present Invention

| Properties Alloy | Zn-22 Al | Zn-0.1 Ni-0.04 Mg | Sn-9.8 Zn | Sn-38 Pb | Mg-33 Al | Mg-6 Zn-0.5 Zr (Zk 60 A) | Mg-6 Al-1 Zn (Az 61 A) |
|---|---|---|---|---|---|---|---|
| Room Temperature Elongation (%) | 20 | 17 | 36 | 78 | 22 | 19 | 21 |
| Elastic Coefficient (kg/mm$^2$) | 7300 | 6600 | 4400 | 4300 | 4100 | 4700 | 4500 |
| Impact Value (kg · m/cm$^2$) | 13.7 | 10.8 | 7.1 | 7.0 | 6.5 | 12.2 | 11.9 |
| Coefficient of Thermal Expansion (10$^{-6}$/° C.) | 24.2 | 30.8 | 20.4 | 23.9 | 26.1 | 28.2 | 26.5 |
| Environmental Pollution | None | None | None | Pb pollution | None | None | None |
| Cost (USD/kg) | 5.6 | 4.2 | 7.8 | 7.5 | 10.7 | 12.8 | 12.5 |

TABLE 2

Physical and Mechanical Properties of Some Plastics

| Physical and Mechanical Properties | ABS | PPO | PS | ABS/PC |
|---|---|---|---|---|
| Thermal Deformation Temp (° C.) | 90~108 | 180~204 | 65~96 | 120~124 |
| Softening point (° C.) | 120~160 | 300 | 120~165 | 220~240 |
| Forming Temp(° C.)(in general) | 200~220 | 270~300 | 210~250 | 230~270 |
| Volume Resistivity ($\mu\Omega$ · cm) | 6.9 × 10$^{22}$ | 2.0 × 10$^{23}$ | >10$^{22}$ | 2.9 × 10$^{23}$ |
| Density (g/cm$^3$) | 1.02~1.16 | 1.06~1.07 | 1.04~1.06 | 1.10~1.19 |
| Tensile Strength (kg/mm$^2$) | 3.8~4.5 | 4.9~6.9 | 3.5~6.3 | 4.5~5.3 |
| Elongation (%) | 13~35 | 14~50 | 1.0~2.5 | 40~86 |
| Flexural Strength (kg/mm$^2$) | 6.7~8.0 | 8.4~14 | 6.1~9.8 | 9.0~10.8 |
| Elastic Coefficient of Flexural (kg/mm$^2$) | 250 | 246 | 310 | 329 |
| Izod Impact Value (kg · cm/cm) | 13 | 9.5 | 0.7 | 19 |
| Coefficient of Linear Expansion (10$^{-5}$/° C.) | 6~8 | 5.2~6.6 | 6~8 | 5~7 |
| Cost (US$/kg) | 2.2 | 4.3 | 1.7 | 2.3 |

Referring to FIG. 1, a schematic diagram of the apparatus for manufacturing the electromagnetic interference shielding metallic foil cladded plastic product of the present invention is shown. The apparatus includes a mold and an injection port 6. The mold includes a first half mold block 1, a second half mold block 9, and a mold base 8. The second half mold block 9 and the mold base 8 are controlled by crank arm or oil pressure.

The injection port 6 is attached to an injection machine (not shown) at one end, and is attached to the first half mold block 1 at the other end. The injection machine is capable of introducing softened plastic to the mold through the injection port 6.

The first half mold block 1 is provided with a vent line 2. The vent line 2 is provided with a gas pressure controlling valve 3, vacuum pumping valve 4, and gas inlet controlling pin 5. In addition, the first half mold block 1 has a predetermined shape to define the shape of the softened plastic injected from the injection machine.

The first and second half mold blocks 1 and 9 are capable of holding the edges of the superplastic alloy plate or foil. In the inner portion of the second half mold block 9 is provided with heating wires 10, which provides the heating source for heating during superplastic forming.

The mold base 8 has a predetermined shape to define the shape of the superplastic alloy plate or foil. Preferably, the edges of the mold base 8 are designed to have a knife shape, such that when the final metallized plastic product is completed, the excess side material of the product can be cut off.

A stopper 7 is movably disposed in the injection port 6 and capable of whether or not there is communication between the mold and the injection port 6.

The process for manufacturing the metallized plastic product will be described in more detail.

Referring to FIG. 1, one side of a superplastic alloy plate (M) is sprayed with a coupling agent or a hot melt adhesive. After drying, the superplastic alloy plate (M) is placed in the superplastic forming/injection molding apparatus of the present invention.

Figure 2:
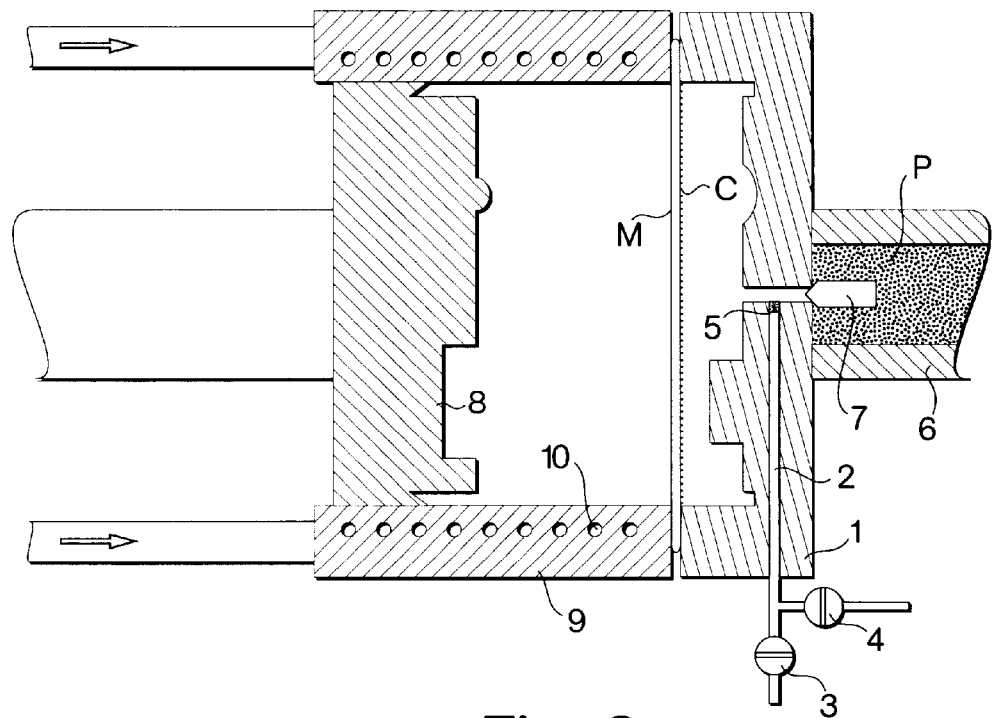
FIG. 2 is a schematic diagram showing that the second half mold block has been moved to the first half mold block to hold the edges of the superplastic alloy plate.

Then, referring to FIG. 2, the second half mold block 9 is moved to the first half mold block 1, and the edges of the superplastic alloy plate (M) are held between the first and second half mold blocks 1 and 9 by the pressure of the second half mold block 9.

Figure 3:
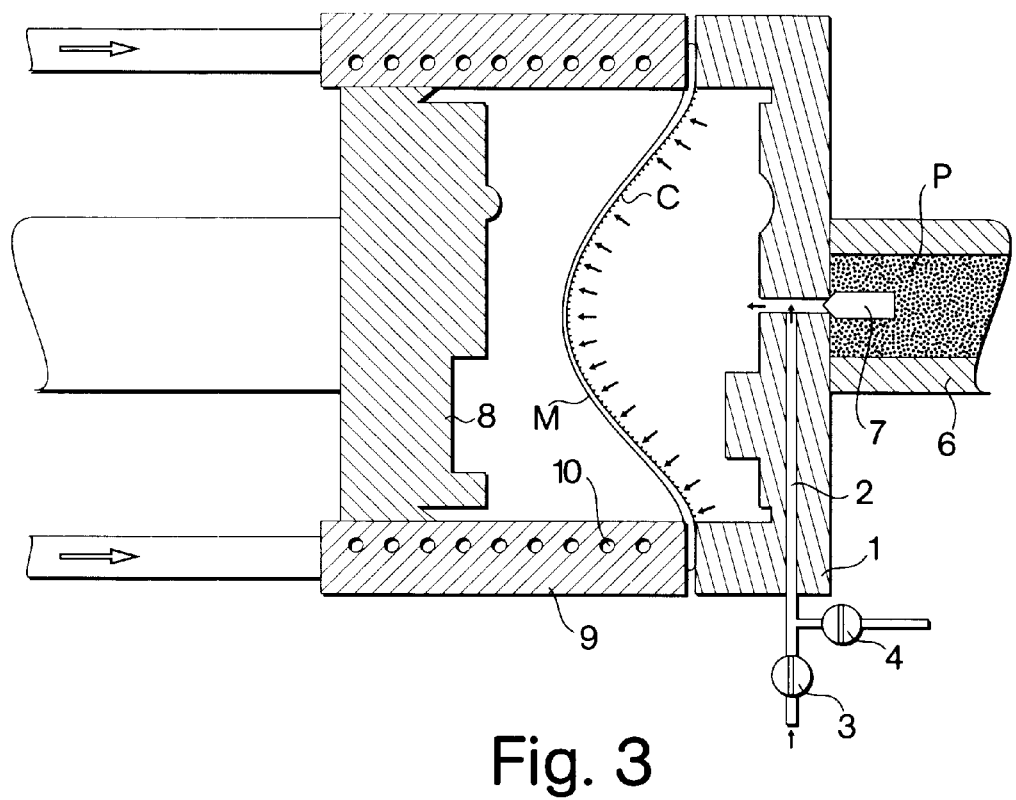
FIG. 3 is a schematic diagram showing that the superplastic alloy plate is being superplastically blown by the gas from the vent line.
Figure 4:
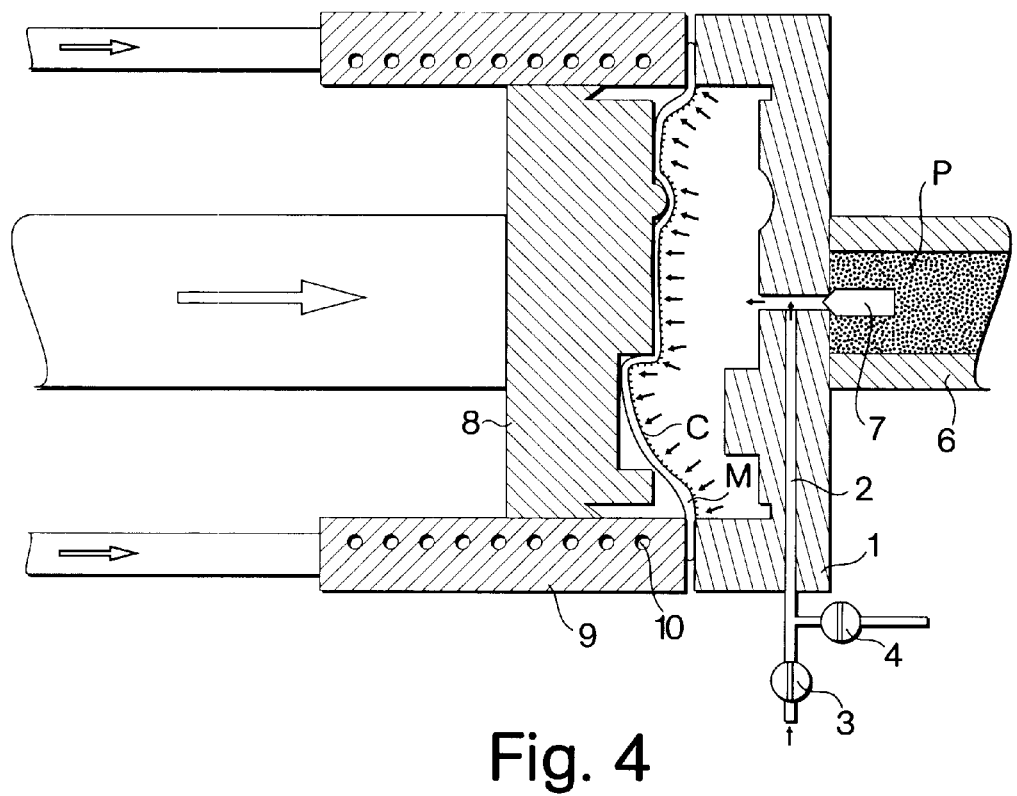
FIG. 4 is a schematic diagram showing that the mold base has been moved to the first half mold block.
Figure 5:
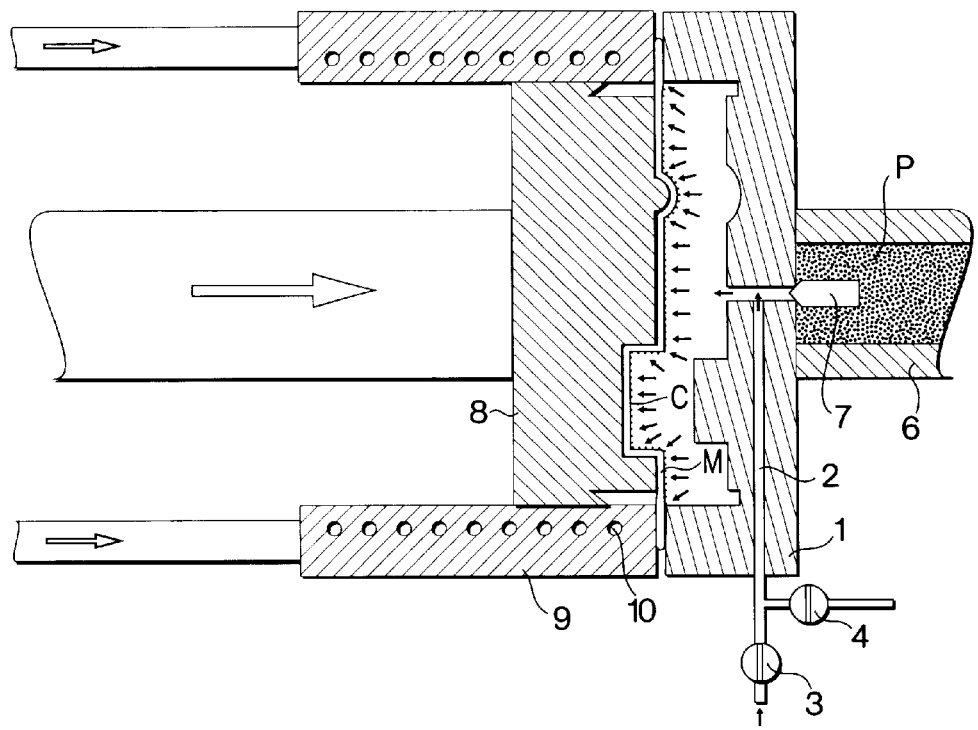
FIG. 5 is a schematic diagram showing that the superplastic alloy plate has been formed according to the shape of the mold base.
Figure 6:
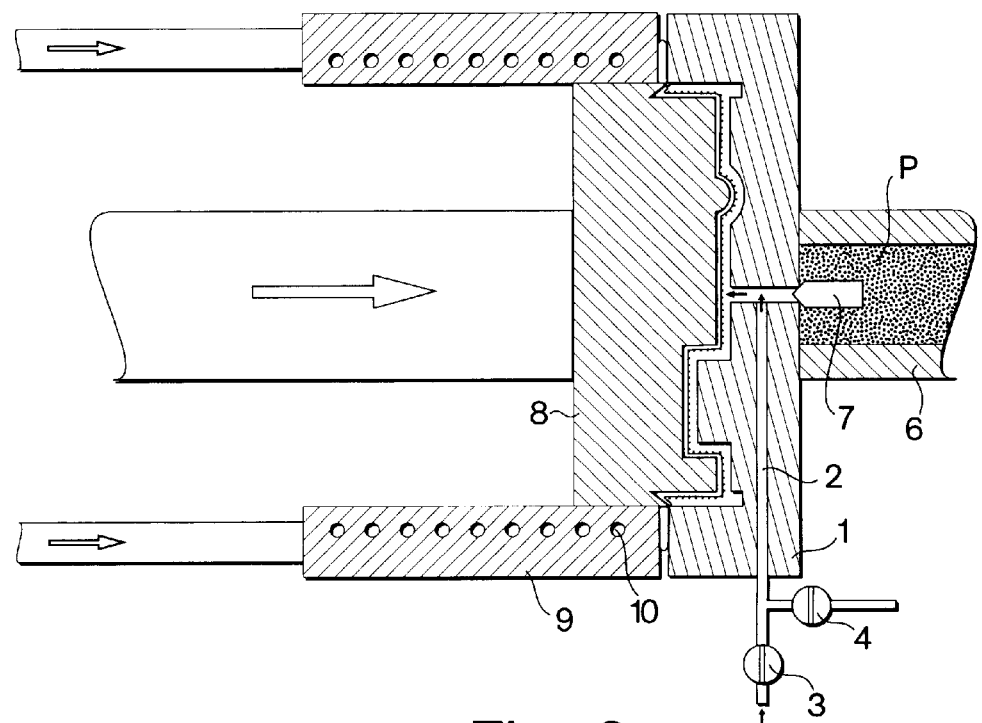
FIG. 6 is a schematic diagram showing that the mold base has stopped moving.

Referring to FIG. 3, the second half mold block 9 is heated to a superplastic forming temperature range of the superplastic alloy plate (M) by the heating wires 10. The suitable superplastic forming temperature ranges for some superplastic alloys and other suitable conditions are shown in Table 3. The gas inlet controlling pin 5 of the vent line 2 of the first half mold 1 is opened, and argon gas with suitable pressure is introduced via the gas pressure controlling valve 3. In this way, the superplastic alloy plate (M) is superplastically blown and deformed. When a desired deformation is achieved, referring to FIG. 4, the mold base 8 is moved to the first half mold block 1 by crank arm or oil pressure, while the argon pressure for superplastic blowing is maintained constant. The superplastic plate (M) will gradually contact with the mold base 8 and be gradually deformed into a foil with the shape defined by the mold base 8. The superplastic blowing step is continued as shown in FIG. 5. When the superplastic alloy foil of a desired thickness is attained, the movement of mold base 8 is stopped (see FIG. 6). At that time, the side material of the superplastic alloy foil can be cut by the knife structure of the mold base 8.

Basically, there is no limitation to the gas used for the superplastic blowing of the superplastic alloy. However, to prevent oxidation of the superplastic alloy by the gas during superplastic blowing, the gas is preferably a protective gas that contains no oxygen, such as argon or nitrogen. The gas preferably has a pressure of 0.10 to 1.00 kg/mm$^2$.

Figure 7:
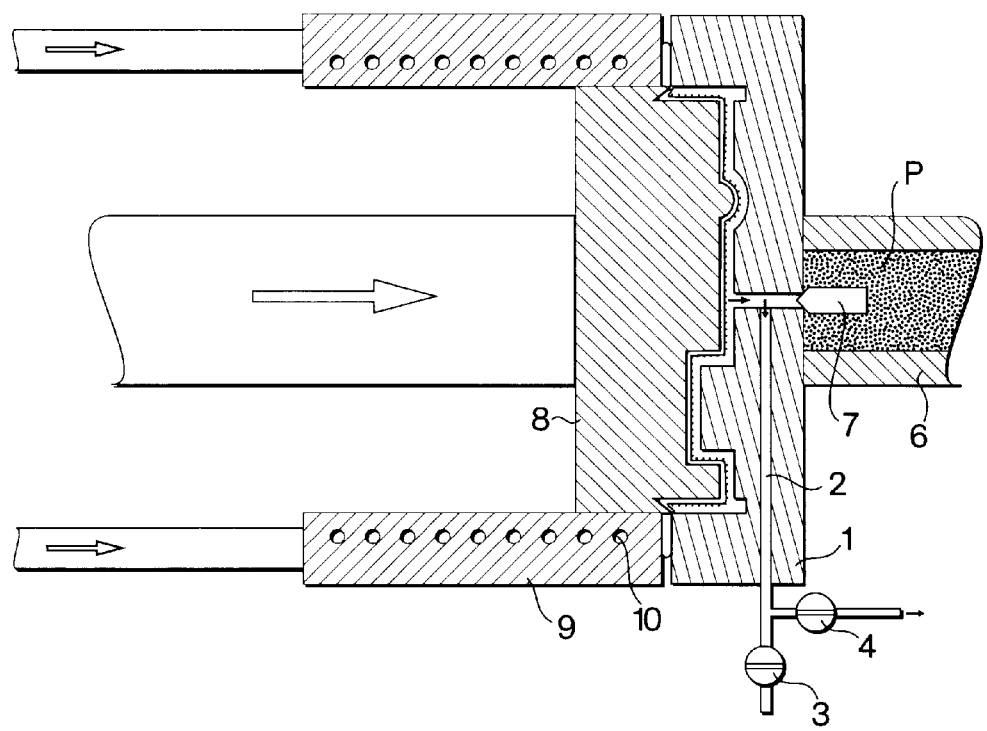
FIG. 7 is a schematic diagram showing that the gas pressure controlling valve has been closed, and the mold cavity is being pumped to vacuum.
Figure 8:
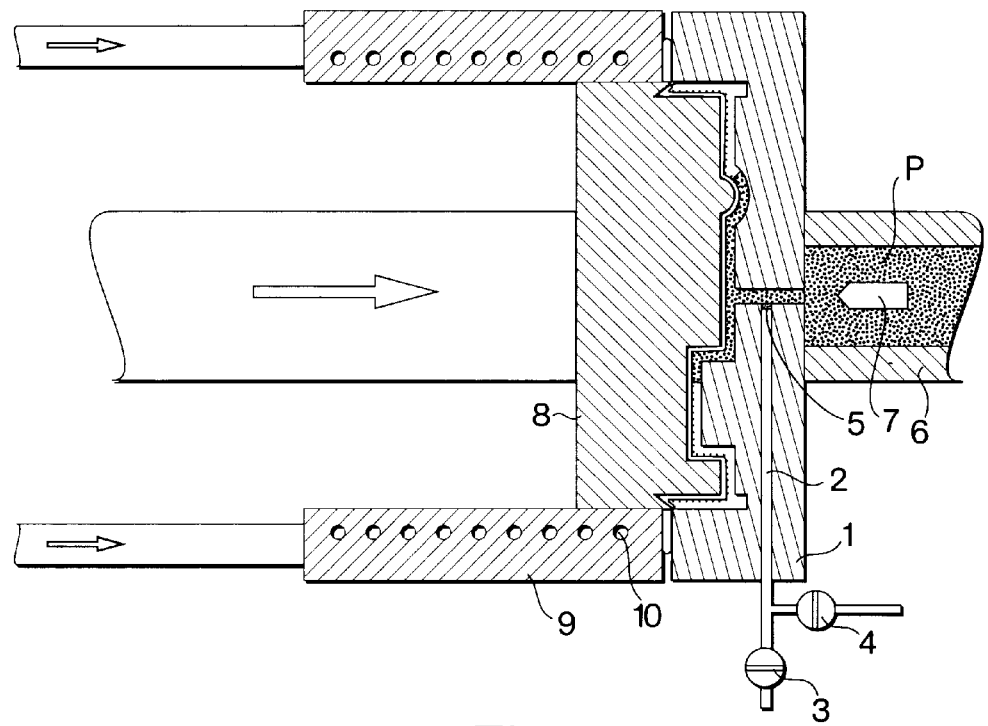
FIG. 8 is a schematic diagram showing that the vacuum pumping valve and the gas inlet controlling pin have both been closed, the stopper in the injection port has been opened, and the softened plastic is being injected to the mold cavity.
Figure 9:
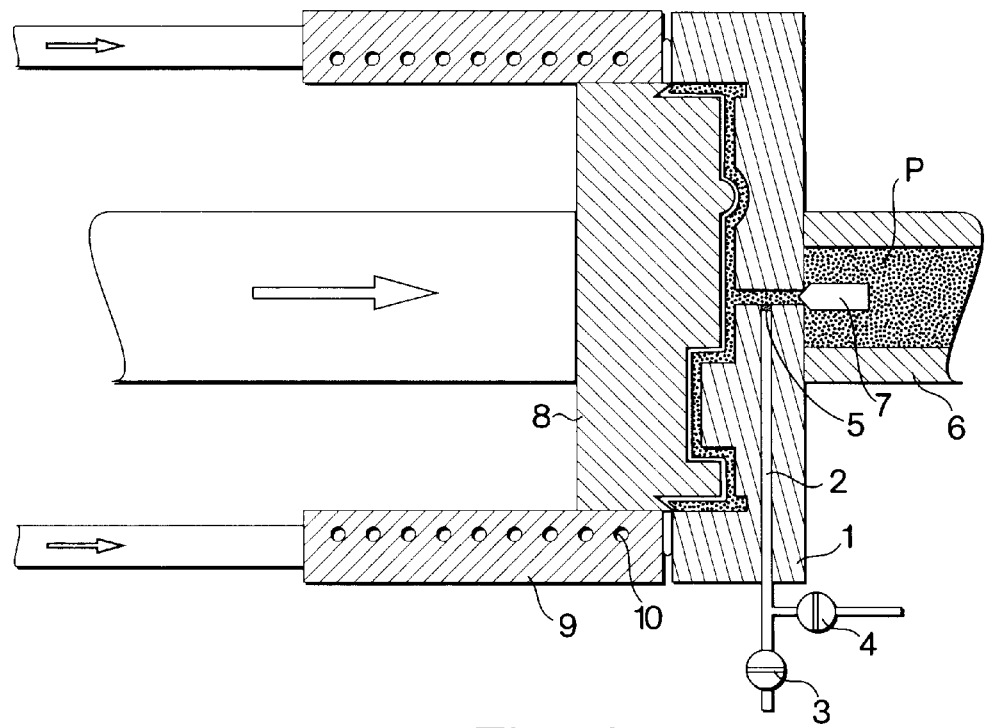
FIG. 9 is a schematic diagram showing that the softened plastic has filled in the whole mold cavity.

Subsequently, the gas pressure controlling valve 3 is closed, and the vacuum pumping valve 4 is opened, as shown in FIG. 7. The mold cavity is evacuated to a pressure of 10$^{-3}$ Torr or less by a vacuum pump. Then, referring to FIG. 8, the vacuum pumping valve 4 and the gas inlet controlling pin 5 of the vent line 2 are both closed, and then the stopper 7 in the injection port 6 is opened, such that softened plastic is introduced to the mold cavity via the injection port 6 until the whole mold cavity is filled by the softened plastic (see FIG. 9).

To increase the production speed and to save energy, the mold is preferably heated to a temperature at which the superplastic alloy can be superplastically deformed and the plastic can be in the softened state during the whole process. In this manner, the mold can be maintained at the same temperature, and there is no need to change the temperature of the mold. To meet the requirements of the superplastic deforming of the superplastic alloy and the melting of the plastic, the mold is preferably heated to a temperature ranging from 150° C. to 350° C.

Figure 10:
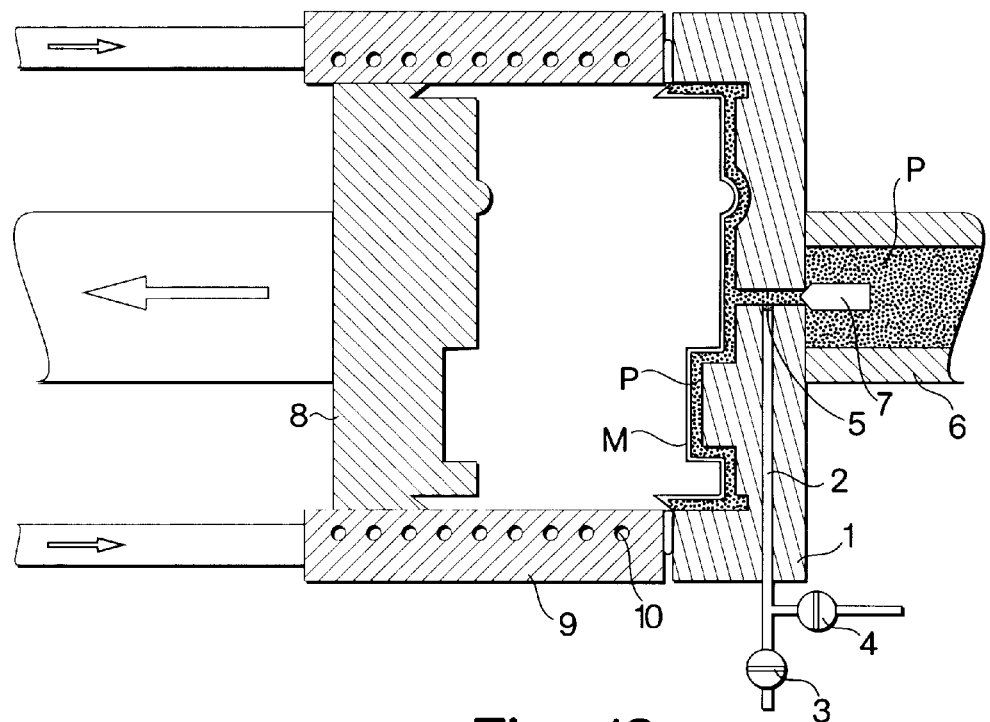
FIG. 10 is a schematic diagram showing that the mold base is being moved apart from the first half mold block.
Figure 11:
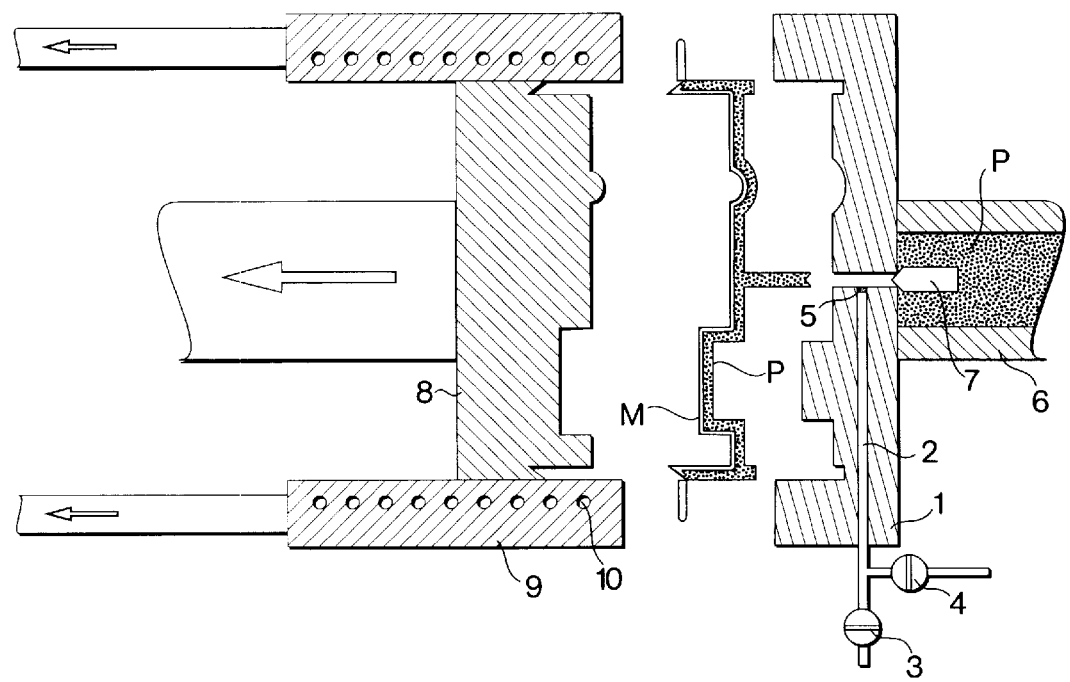
FIG. 11 is a schematic diagram showing that the second half mold block has been moved apart from the first half mold block.
Figure 12:
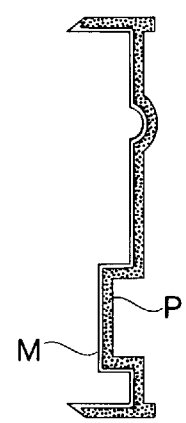
FIG. 12 shows the electromagnetic interference shielding metallic foil cladded plastic product of the present invention.

Then, referring to FIG. 10, the mold base 8 is moved apart from the first half mold block 1, and then referring to FIG. 11, the second half mold block 2 is also moved apart. The workpiece thus formed is moved out, the side material is cut, and the final electromagnetic interference shielding metallic foil cladded plastic product as shown in FIG. 12 is obtained.

was heated and maintained at 200° C., and an argon atmosphere having a pressure of 0.1 kg/mm$^2$ was introduced to the mold to superplastically blow the Zn-22Al plate into a foil about 0.2 mm thick.

Then, the argon pressure was shut off and the mold was evacuated to a reduced pressure of 10$^{-3}$ Torr. Subsequently, softened ABS+20 wt. %PC was injected to the mold from the injection machine, and adhered onto one surface of the Zn-22Al foil. The ABS+20 wt. %PC so adhered has a thickness of about 1.8 mm.

Figure 13:
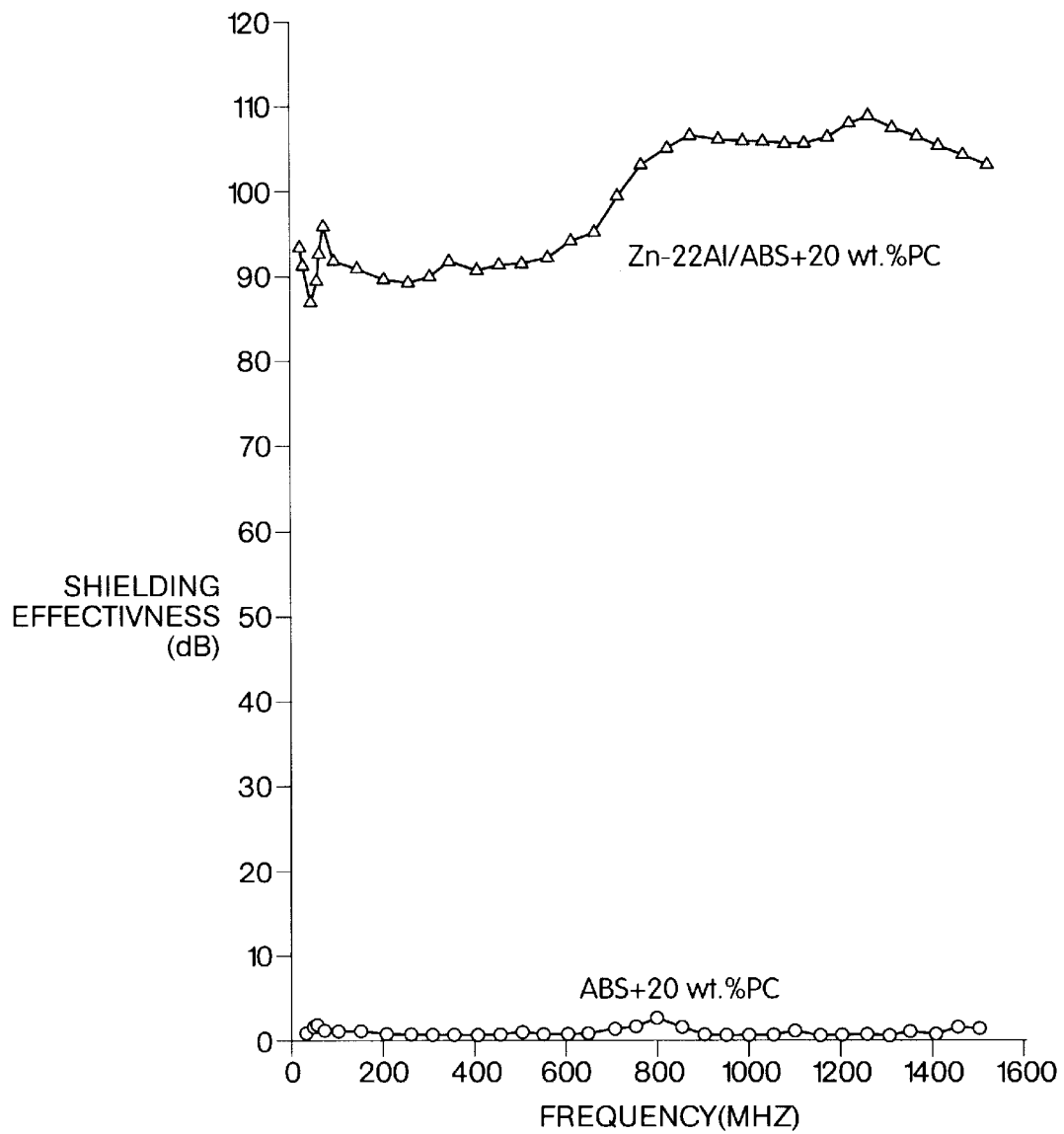
FIG. 13 shows the shielding effectiveness of the electromagnetic interference shielding metallic foil cladded plastic product obtained from the example of the present invention.

The total thickness of the final electromagnetic interference shielding metallic foil cladded plastic work piece was about 2 mm, in which the plastic (ABS+20 wt. %PC) was about 1.8 mm and the metallic foil (Zn-22Al foil) was about 0.2 mm. The shielding effectiveness of the work piece in the frequency ranging from 30 MHz to 1500 MHz according to ASTM-D4935-89 is shown in FIG. 13. With values between 90 dB and 110 dB, the results indicate that the formed work piece has excellent shielding effectiveness, e.g., equal to that of a metallic plate. FIG. 13 also shows that an ABS+20 wt. %PC work piece not clad with metallic foil has nearly no electromagnetic interference shielding effect.

The advantages of the present invention can be summarized as follows:

1. Since superplastic forming has the advantages of large deformation and intricate forming, which are also the advantages of plastic molding; therefore, the metallic foil cladded plastic product of the present invention can have as intricate a shape as an ordinary plastic product. However, a conventional metallic shield can not achieve such an intricate shape.

2. Since one side of the metallic plastic product of the present invention is still a complete plastic layer, the product can exhibit the color and pleasing appearance of the plastic.

3. The cladded metallic foil can be formed to a very thin thickness by superplastic forming. Thus, the final metallic plastic product is still as light weight and thin as an ordinary plastic product.

4. Since the cladded metallic foil is a continuous and complete layer (solid), the obtained metallic plastic product

TABLE 3

| | Conditions Suitable for the Superplastic Alloys of the Present Invention | | | | | | |
| --- | --- | --- | --- | --- | --- | --- | --- |
| Alloy Suitable Conditions | Zn-22 Al | Zn-0.1 Ni- 0.04 Mg | Sn-9.8 Zn | Sn-38 Pb | Mg-33 Al | Mg-6 Zn-0.5 Zr (Zk 60 A) | Mg-6 Al-1 Zn (Az 61 A) |
| Plastic | ABS, PPO PS, ABS/PC | ABS, PPO, PS, ABS/PC | ABS, PS | ABS, PS | PPO, ABS/PC | PPO, ABS/PC | PPO, ABS/PC |
| Forming Temp (° C.) | 180~250 | 180~250 | 156~180 | 150~170 | 300~310 | 300~310 | 300~310 |
| Forming Pressure (kg/mm$^2$) | 0.07~0.4 | 0.1~0.7 | 0.05~0.2 | 0.05~0.2 | 0.1~0.7 | 0.2~1.0 | 0.2~1.0 |

The following example is intended to illustrate the process and the advantages of the present invention more fully without limiting its scope, since numerous modifications and variations will be apparent to those skilled in the art.

EXAMPLE

The process was conducted according to the above descriptions. A coupling agent (Silane A-187 manufactured by UNION CARBIDE Chemicals and Plastics Company) was mixed with ethanol to a 1 wt % solution. A Zn-22Al superplastic alloy plate of 0.3 mm was sprayed with the coupling agent solution on one side. The pre-coated Zn-22Al plate was placed in a mold to be processed according to the above-mentioned process of the present invention. The mold can achieve the same shielding effectiveness (higher than 60 dB) as a conventional metallic shield.

5. Compared with the conventional process of metallizing plating on plastics, the present invention has a low production cost, an absence of environmental pollution problems, and the metallic layer does not easily peel off. The waste products can easily be separated to metallic foil and plastic, and are easily collected.

6. Compared with the process for manufacturing conductive component-filled plastic composite, the present invention not only achieves a high shielding effectivenss (higher than 60 dB), but also the cladded metallic foil provides a reinforcing action to the plastic layer; thus, the mechanical properties of the final metallized plastic product will not be adversely affected. In addition, all the inferior phenomena including lag, segregation, orientional, and floating that occur in the production of the conventional conductive component-filled plastic composite can be effectively solved. Also, the wear of mold, screws, and compressing cylinder walls of the injection machine can be prevented.

What is claimed is:

1. A process for manufacturing an electromagnetic interference shielding metallic foil cladded plastic product, comprising the following sequential steps of:

(a) coating one side of a superplastic alloy plate with a coupling agent or a hot melt adhesive;

(b) placing the coupling agent- or hot melt adhesive-coated superplastic alloy plate in a mold, and superplastically forming the superplastic alloy plate to a superplastic alloy foil with a predetermined shape, such that another side of the superplastic alloy foil is attached to the mold and the coupling agent- or hot melt adhesive-coated side of the superplastic alloy foil is spaced apart from the mold to form a mold cavity, wherein an injection machine is attached to the mold cavity, and wherein the injection machine is capable of injecting softened plastic into the mold cavity;

(c) introducing softened plastic from the injection machine to the mold cavity, such that plastic adheres on the coupling agent- or hot melt adhesive-coated side of the superplastic alloy foil, and an electromagnetic interference shielding metallic foil cladded plastic product is formed; and (d) removing the plastic product from the mold.

2. The process as claimed in claim 1, wherein in step (b), the superplastic alloy plate is superplastically formed by superplastic blowing using a gas.

3. The process as claimed in claim 1, wherein the softened plasic is injected into the mold cavity with simultaneously vacuuming the mold cavity to a reduced pressure.

4. The process as claimed in claim 1, wherein the superplastic alloy is selected from the group consisting of zinc alloys, aluminum alloys, magnesium alloys, titanium alloys, tin alloys, duplex stainless steels, and super alloys.

5. The process as claimed in claim 1, wherein the temperature of the mold is maintained at 150° C. to 350° C.

6. The process as claimed in claim 1, wherein the plastic is in a softened state when at the temperature of the mold.

7. The process as claimed in claim 2, wherein the gas is a protecting gas selected from argon or nitrogen.

8. The process as claimed in claim 2, wherein the pressure of the gas is in the range from 0.1 to 100 $kg/mm^2$.

9. The process as claimed in claim 1, wherein the coupling agent is selected from the group consisting of silanes, titantates, zirconates and aluminates.

10. The process as claimed in claim 1, wherein the hot melt adhesive is selected from the group consisting of polyvinyl acetate, ethylene vinyl acetate copolymers, rosin and terpene resin.

11. The process as claimed in claim 1, wherein the plastic is a thermoplastic.

12. The process as claimed in claim 10, wherein the plastic is selected from the group consisting of acrylonitrile-butadiene-styrene (ABS), polystyrene (PS), polyphenylene oxide (PPO) and acrylonitrile-butadiene-styrene/polycarbonate (ABS/PC).

* * * * *